Patented May 14, 1929.

1,712,709

UNITED STATES PATENT OFFICE.

WILHELM LOMMEL, OF WIESDORF-ON-THE-RHINE, AND THEODOR GOOST, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

HYDROGENATION OF AROMATIC BASES.

No Drawing. Application filed November 10, 1927, Serial No. 232,469, and in Germany November 26, 1926.

Catalytic hydrogenation of aromatic bases under pressure does not proceed smoothly, since numerous by-products are formed.

The present invention concerns improvements in and relating to the manufacture of hydrogenated aromatic bases. It consists in separating the hydrogenated product from the still unchanged parts e. g. by distillation after which further hydrogenation is caused to proceed.

According to the present invention the proportion of the desired hydrogenated products in relation to the by-products is very favorably increased.

The following example will serve to illustrate our invention:

*Example.*—100 parts by weight of methylaniline are hydrogenated in the presence of 2 parts by weight of a nickel catalyst at 280 to 300° C. under a pressure of about 100 atm. until about 20 percent of the theoretical quantity of hydrogen has been absorbed. The greater part of the hexahydromethylaniline thus formed is removed by distillation, then the hydrogenation is continued in the same manner. According to this method of hydrogenating only 16 parts by weight of by-products are produced in respect of 100 parts by weight of hexyhydromethyl-aniline, whereas by following the hitherto customary process of hydrogenating without interruption until the completion of the absorption of hydrogen 65 parts by weight of by-products were obtained in respect of every 100 parts by weight of hexahydromethyl-aniline.

We claim:

1. In the process of catalytically hydrogenating an aromatic base, the improvement which consists in arresting the reaction before hydrogenation of the whole mass is complete, separating the hydrogenated products from the unchanged base, and further hydrogenating a portion of the unchanged base.

2. In the process of catalytically hydrogenating an aromatic base, the improvement which consists in arresting the reaction before hydrogenation of the whole mass is complete, separating by distillation the hydrogenated products from the unchanged base, and further hydrogenating a portion of the unchanged base.

3. In the process of catalytically hydrogenating a methyl-aniline, the improvement which consists in arresting the reaction before hydrogenation of the whole mass is complete, separating the hexa-hydro-methylaniline from the unchanged base, and further hydrogenating a portion of the unchanged base.

4. In the process of catalytically hydrogenating a methyl-aniline, the improvement which consists in arresting the reaction before hydrogenation of the whole mass is complete, separating by distillation the hexa-hydro-methyl-aniline from the unchanged base, and further hydrogenating a portion of the unchanged base.

In testimony whereof we have hereunto set our hands.

WILHELM LOMMEL.
THEODOR GOOST.